United States Patent [19]
Sweeney

[11] Patent Number: 5,862,777
[45] Date of Patent: Jan. 26, 1999

[54] FEEDER

[76] Inventor: James E. Sweeney, 417 Quail Ridge Rd., Aledo, Tex. 76008

[21] Appl. No.: 828,740

[22] Filed: Mar. 26, 1997

[51] Int. Cl.$^6$ ..................................................... A01K 1/00
[52] U.S. Cl. ......................................... 119/57.91; 222/174
[58] Field of Search .............................. 119/57.91, 57.92, 119/52.1, 52.2, 57.8, 786, 788; 222/174

[56] References Cited

U.S. PATENT DOCUMENTS

| | | | |
|---|---|---|---|
| 370,004 | 9/1887 | Bruner | 222/174 |
| 1,078,005 | 11/1913 | Shanks | 222/174 |
| 1,473,852 | 11/1923 | Harrell | 222/174 |
| 2,544,578 | 3/1951 | Winkler | 119/54 |
| 2,691,361 | 10/1954 | McAnly | 119/52.1 |
| 3,195,508 | 7/1965 | Lehman et al. | 119/57.91 |
| 3,677,230 | 7/1972 | Braden | 119/57.91 |
| 4,027,627 | 6/1977 | Fillion | 119/57.91 |
| 4,625,888 | 12/1986 | Thompson | 220/262 |
| 4,945,859 | 8/1990 | Churchwell | 119/57.91 |
| 5,170,750 | 12/1992 | Ricketts | 119/52.3 |
| 5,218,784 | 6/1993 | Pollock | 49/279 |
| 5,570,547 | 11/1996 | Webb et al. | 52/194 |

*Primary Examiner*—John J. Wilson
*Attorney, Agent, or Firm*—Max Ciccarelli

[57] ABSTRACT

A feeder for feeding large wild animals. The feeder has an enclosure for holding feed. A reduced opening toward the bottom of the feeder allows the feed to pass therethrough. The feed enclosure is adapted to cooperate with a feed dispensing apparatus that controls the flow of feed from the reduced opening and is capable of intermittently and selectively dispensing feed by propelling the feed from the reduced opening away from the feeder and within the reach of the animals. A single post supports the feed enclosure above the ground and out of reach of the animals being fed.

14 Claims, 5 Drawing Sheets

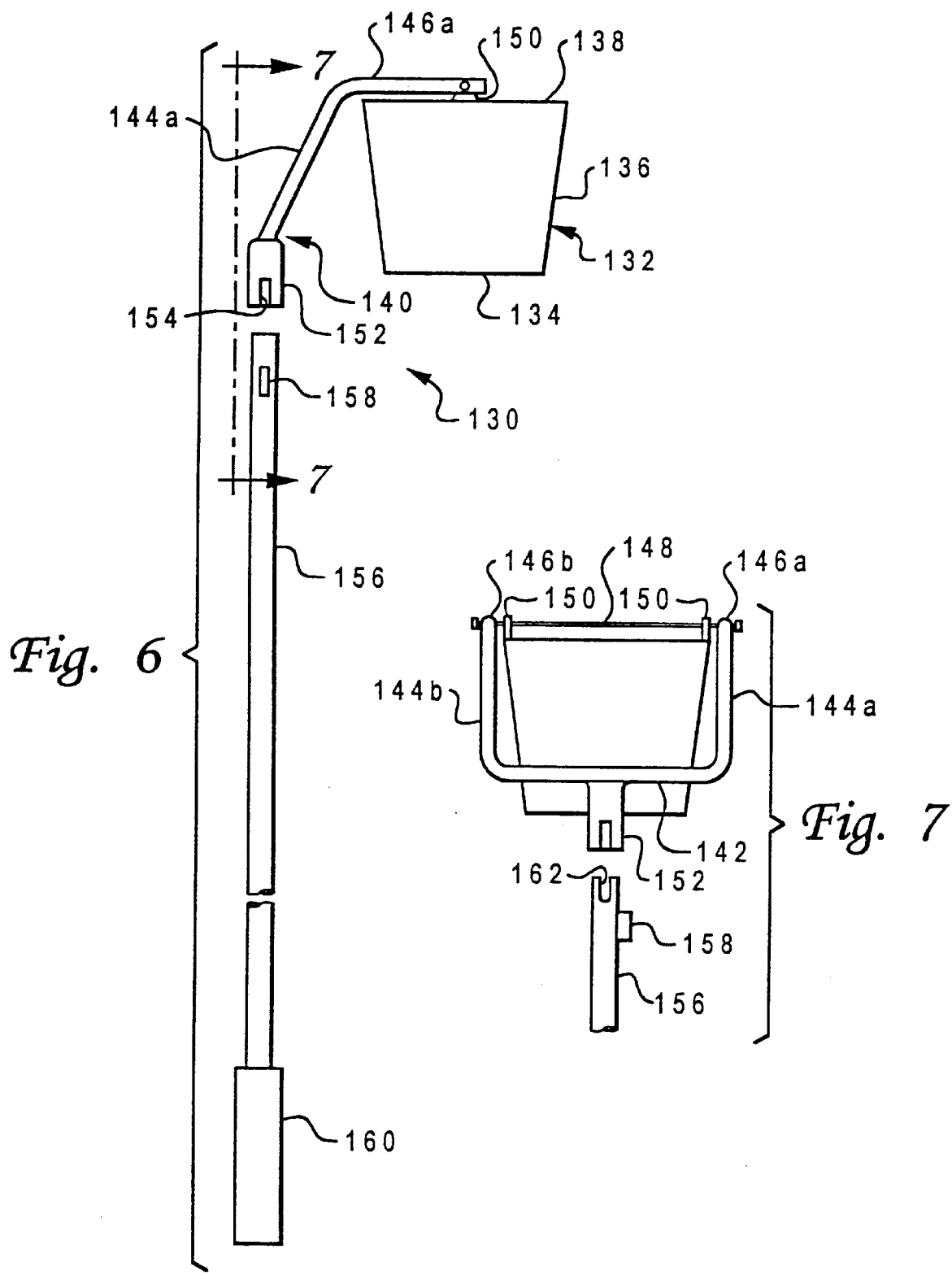

FEEDER

BACKGROUND OF THE INVENTION

1. Field of the Invention

This invention relates in general to game feeders and in particular to deer and hog feeders.

2. Description of the Prior Art

The purpose of deer feeders (deer are used as an example herein, but the concepts applicable to deer also apply to other large wild animals, such as wild hogs and the like) is to supplement the deer's food source. Often, harsh weather or other environmental conditions cause a shortage in the deer's food supply. Shortage of food can cause the deer to move to a different territory, or, where that is not possible, the shortage can result in a malnourished deer population. A malnourished deer population is undesirable for various reasons, but is especially troublesome in areas where the deer are hunted because malnutrition results in poorly developed antlers.

Although it is desirable to maintain a well fed deer population, it is also undesirable to provide excessive feed because it makes the deer dependent on the feed. Deer that become dependent on human-provided feed lose their wild characteristics thereby making them less challenging and enjoyable to hunt. Dependency on human-provided feed is also dangerous for deer because if the feed supply is interrupted (for example, the humans are unable to provide the feed for financial or other reasons), the deer will be at even greater risk than if they had never been fed.

Also, deer feeders are often used in far away and/or hard-to-reach places. Therefore, it is undesirable to have to frequently fill the feeders. Ideally, deer feeders dispense small amounts of feed at predetermined intervals.

A large number of deer feeders on the market today are of the general type shown in FIGS. 1 and 2. Feeder 8 comprises a large feed storage container 10 supported by legs 12a, 12b, and 12c. A ring 14, of diameter slightly larger than container 10 is connected to container 10. Three receivers 16a, 16b, and 16c are connected to ring 14. Receivers 16a, 16b, and 16c are adapted to receive the upper ends of legs 12a, 12b, and 12c. A conical spout 18 is located on the bottom of container 10. A dispensing mechanism 20 is provided for intermittently propelling the feed from spout 18 away from feeder 8 and onto the ground. Dispensing mechanism 20 has a housing 22 connected to container 10 by means of bracket 24. Inside housing 22 is a motor, power supply (usually a battery), and programming means (these three elements are not shown but are well known in the art). The motor is connected to paddle 26. At various pre-selected times throughout the day, the programming means and power means cause the motor to turn quickly thus turning paddle 26 and propelling a pre-determined amount of feed away from feeder 8.

Legs 12a, 12b, and 12c are sufficiently long to maintain container 10 and dispensing means 20 out of the reach of the deer. The dispensing means 20 must be kept out of reach because otherwise the deer could eat food directly from between the conical spout 18 and the paddle 26, thereby finishing the feed prematurely. Legs 12a, 12b, and 12c are angled outwardly from feeder 8, thereby keeping the feeder balanced.

Sometimes, such feeders are suspended from trees, as shown in U.S. Pat. No. 4,945,859. Still other times, a three leg tepee-like structure is formed in which the tops of the legs come together at the a point, and the feeder is suspended from the top of the tepee. As also shown in U.S. Pat. No. 4,945,859, different means of dispensing the feed from the feed container also exist.

Although the deer feeders like those of FIGS. 1 and 2 are generally balanced enough to withstand winds of modest force, they are known to topple when faced with strong winds. Also, wild animals (especially hogs) are notorious for knocking over these types of feeders. Persons have been known to drive stakes through the bottom of the legs of the feeders and into the ground to prevent them from toppling. Although sometimes successful, the stake method is not completely satisfactory because when the ground is muddy the stakes do not hold particularly well.

As a result, many users place fences around the feeders to prevent large animals from knocking the feeders over. Fences of sufficient strength are usually expensive. Also, the feed dispersed inside the fence is often eaten by animals other than the intended recipients of the feed.

The deer feeders of the type shown in FIGS. 1–2 also have the problem of being hard to fill. As discussed above, Deer feeders are generally supported a considerable height above the ground. Although this prevents the deer from taking feed at will from the feed dispensing means, it also makes filling the feeder considerably difficult. In order to fill deer feeders, ladders are often used to gain access to the top of the feeder. Sometimes a vehicle is placed close to the feeder so that the user can climb on the vehicle. Both these methods, in addition to being inconvenient can also be dangerous.

Feeders supported by a single leg, or post, have been used in different applications. For example U.S. Pat. No. 2,544,578, issued to Winkler, discloses a livestock feeding device which is supported by a single leg. However, the Winkler feeding device is not adaptable for feeding deer. This device must be placed within the animal's reach to be functional, and provides no means for limiting the animal's intake of feed.

Another example of a single leg feeder is the birdfeeding device shown in U.S. Pat. No. 5,170,750, issued to Ricketts. The Ricketts device is also not adaptable for feeding deer because it must be within the animal's reach to function, and lacks a means for controlling the animal's intake of feed.

A need exists for a deer feeder that can resist toppling by strong winds and wild animals. The need also exists for such a deer feeder to be easily installable and removable. The need also exists for a deer feeder that is easy to fill.

SUMMARY OF THE INVENTION

It is the general object of the invention to provide a feeder for large wild animals that is not prone to being toppled over, is easy to install and remove, and is easy to fill.

The improved feeder has an enclosure for holding feed. The enclosure has a reduced opening towards the bottom thereof for allowing feed to pass therethrough. A single post supports the feed enclosure above the ground and out of reach from the animals being fed. A feed dispensing apparatus cooperates with the reduced opening so as to control the flow of feed through the reduced opening and to intermittently and selectively dispense feed by propelling the feed away from the feeder and within the reach of the animals being fed.

The above as well as additional objectives, features, and advantages will become apparent in the following description.

BRIEF DESCRIPTION OF THE DRAWINGS

FIG. 6 is a front view of the filling mechanism made according to this invention.

FIG. 7 is a view of the filling mechanism of FIG. 6 taken along line 7—7.

DETAILED DESCRIPTION OF THE INVENTION

Figure 2:
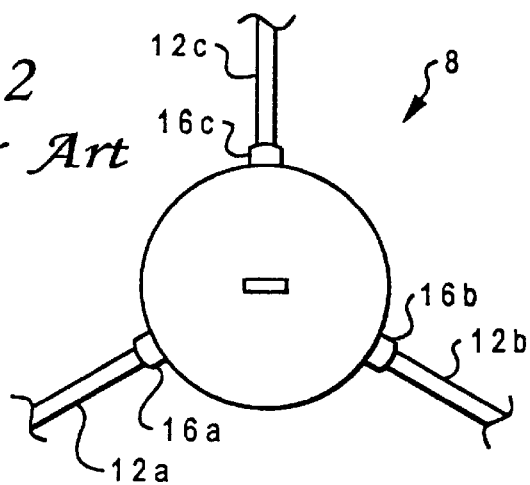
FIG. 2 is a top view of the prior art feeder of FIG. 1.
Figure 1:
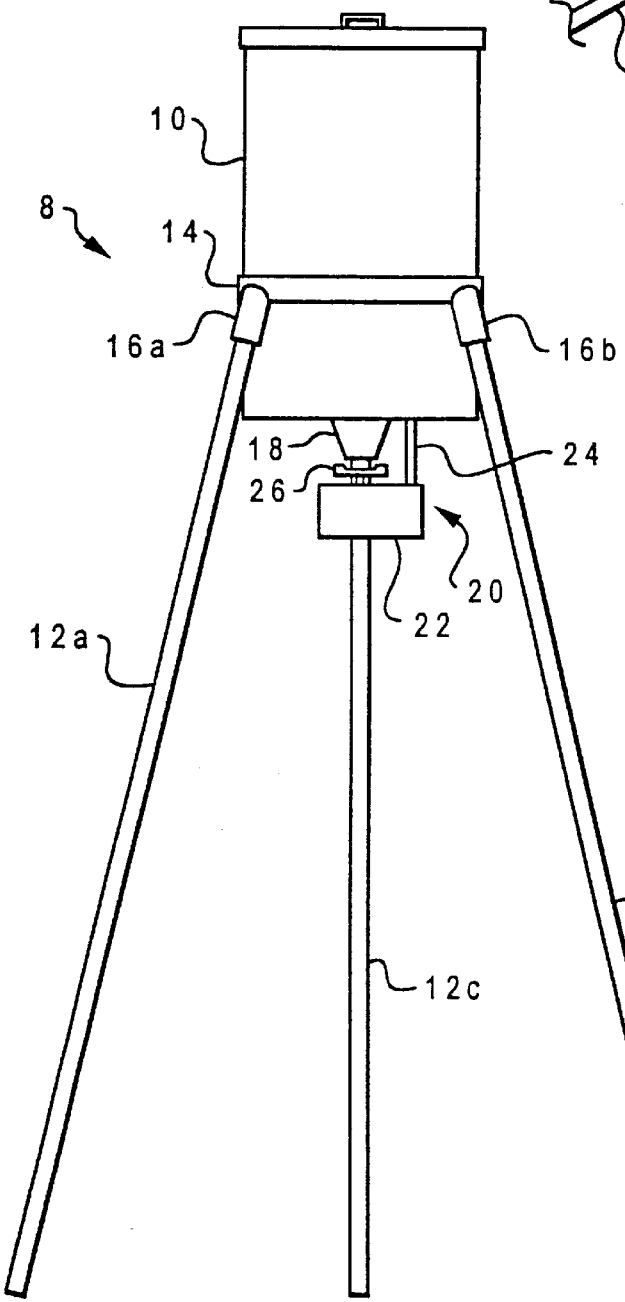
FIG. 1 is a front view of a prior art feeder.
Figure 3:
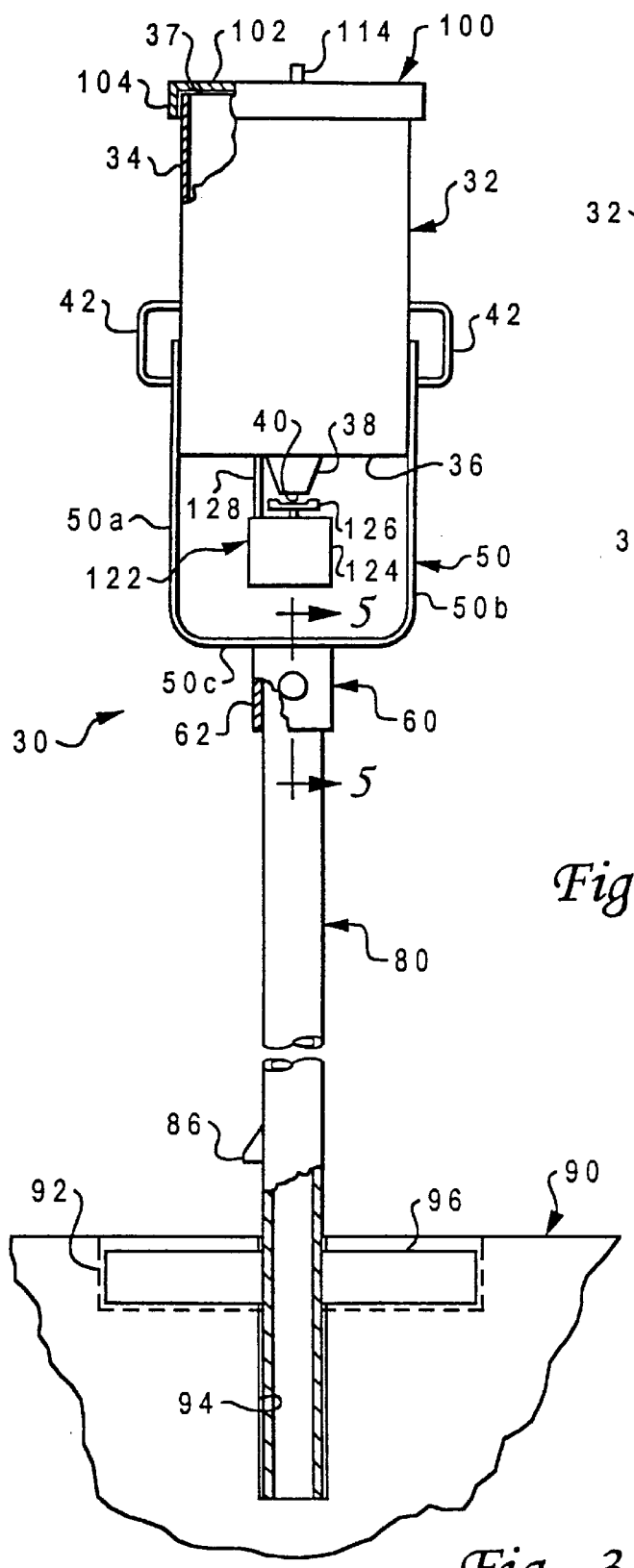
FIG. 3 is a front view of a first embodiment of a feeder made according to this invention.
Figure 4:
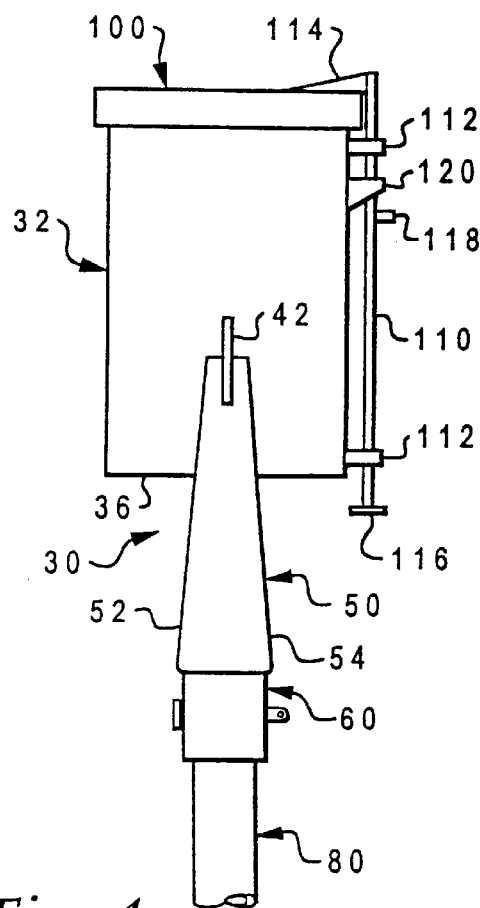
FIG. 4 is a right side view of the feeder of FIG. 3.
Figure 5:
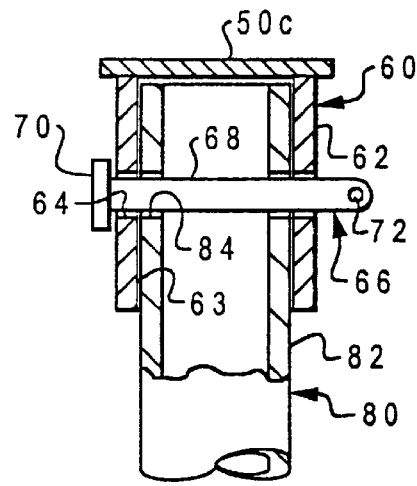
FIG. 5 is a cross-sectional view taken along line 5—5 in FIG. 3.

The preferred embodiment of the invention is shown in FIGS. 3–10. Reference will be made first to FIGS. 3–5. The feeder 30 has a cylindrical feed enclosure 32 defined by a bottom 36 and a sidewall 34. The top of feed enclosure 32 is open, thereby providing a fill opening 37 through which the feed enclosure can be filled with feed. A conical spout 38 is connected to the center of bottom 36 so as to be in communication with the inside of feed enclosure 32. Conical spout 38 has a reduced opening 40 so that feed can pass from inside feed enclosure 32, through spout 38, and through reduced opening 40. Handles 42 are also provided to facilitate transportation and installation of feeder 30.

A U-shaped bracket 50 having left and right vertical portions 50a, 50b and bottom portion 50c is provided. The upper portions of left and right vertical portions 50a, 50b are welded to sidewall 34 of feed enclosure 32. For example, a weld can be made along the portions of the front and back edges of U-shaped bracket 50 that contact sidewall 34. U-shaped bracket 50 is sized so that when it is welded to feed enclosure 32 sufficient space is left between bottom 36 of feed enclosure 32 and bottom portion 50c of U-shaped bracket 50 for the placement of feed-dispensing apparatus 122 as explained in more detail below.

A collar 60 is welded to the lower surface of bottom portion 50c of bracket 50. Collar 60 has a cylindrical sidewall 62 defining a cylindrical inner surface 63. The diameter of inner surface 63 of collar 60 is slightly larger than the outer diameter of wall 82 of post 80 so that the upper end of post 80 fits within collar 60. Although the inner diameter of collar 60 has to be large enough to accept the top of post 80, is should not be so large so as to allow excessive play between collar 60 and top of post 80. Collar 60 is of sufficient length to safely and securely support feed container 32, bracket 50, and the other apparatus located above collar 60.

Referring now primarily to FIG. 5, a detail of the connection between collar 60 and post 80 is shown. A hole 64, extending perpendicularly to the longitudinal axis of collar 60, is located through collar 60. A hole 84, extending perpendicularly to the longitudinal axis of post 80, and located toward the top of post 80 extends therethrough. Holes 64 and 84 are located such that when the top of post 80 is located within collar 60 and appropriately rotated, holes 64 and 84 register with each other. A pin 66 is provided having a shaft 68 with an outer diameter slightly smaller than the inner diameter of holes 64 and 84. Pin 66 also has a head 70 which has outer dimensions larger than the inner diameter of hole 64. Shaft 68 of pin 66 is longer than the outer diameter of collar 60 so that when pin 66 is fully inserted through holes 64 and 84, a portion of shaft 68 extends outside collar 60. A hole 72 perpendicular to the longitudinal axis of shaft 68 is provided in the portion of shaft 68 which extends outside of collar 60 when the shaft is fully inserted through holes 64 and 84. Hole 72 is adapted to receive a cotter pin or pad-lock. Use of a pad-lock would prevent theft of feeder 30.

Referring primarily to FIG. 4, the anchoring of post 80 to the ground 90 is also shown. The anchoring of post 80 to ground 90 is best described by explaining how it is made. A hole 92 is dug in the ground 90. Ordinarily, hole 92 is rather shallow, about one foot in depth, and about two to three feet in diameter. A second hole 94, concentric with hole 92, is dug in the ground 90. Ordinarily hole 94 will be about two to three feet deep and approximately equal to or slightly larger than the outer diameter of post 80. Post 80 is placed inside hole 94 and cement 96 is poured in hole 92. Once the cement 96 had dried, dirt can be used to cover up the cement 96. With post 80 anchored in such a fashion to ground 90, it will securely support feeder 30.

Post 80 should be of sufficient length to keep feed enclosure 32 and the feed-dispensing apparatus 122 out of reach of the animals being fed. In the preferred embodiment, post 80 keeps the collar 60 at a height of about seven feet. The importance of keeping the feed-dispensing apparatus 122 out of reach of the animals being fed is that otherwise the animals being fed could take feed at-will, thereby rendering useless the selective dispensing feature of feed-dispensing apparatus 122.

A protrusion, or removal tab, 86 is welded toward the lower portion of post 80, about a foot above ground 90. A user wishing to remove post 80 from ground 90 after post 80 has already been anchored thereto as described above, can place a chain around post 80 and below removal tab 86 and pull the chain with a tractor, truck, or other pulling means, thereby removing the post 80 from ground 90.

Referring still primarily FIGS. 3–4, a lid apparatus is also shown. Lid 100 has a circular body 102 having a circumference from which depends a lip 104. The inner diameter of lip 104 is slightly larger than the outer diameter of feed enclosure 32 so that lip 104 fits over feed enclosure 32. In FIGS. 3 and 4, lid 100 is shown in its closed position in which it covers fill opening 37.

A lid control bar 110 extends vertically along the side of feed enclosure 32. Lid control bar 110 is connected to the feed enclosure 32 so that bar 110 can slide vertically with respect to feed enclosure 32 and pivot about its longitudinal axis. The connection between bar 110 and feed enclosure 32 is made with two brackets 112. Brackets 112 are connected to the exterior of sidewall 34 of feed enclosure 32. A hole extends vertically through each of the brackets 112. The inner diameter of the holes through brackets 112 is slightly larger than the outer diameter of bar 110. This allows bar 110 to slide and rotate with respect to brackets 112.

A flange 114 connects a periphery of lid 100 to the top of bar 110, thereby allowing the movement of lid 100 to be controlled by operating bar 110. The lid system has a support means comprising a stop means 118 connected to bar 110 and a stop means 120 connected to feed enclosure 32. Stop means 118 and 120 cooperate with each other so as to support lid 100 when lid 100 is in its open position, as further described below.

A small bar 116 is welded to the bottom of bar 110 to form the shape of an inverted "T" at the bottom of bar 110. This small bar 116 facilitates the operation of the lid as further described below.

Referring now primarily to FIG. 3, the feed-dispensing apparatus 122 is shown. Feed-dispensing apparatuses such as the one described herein are commercially and widely available and well known in the hunting industry. Bracket 128 is used to support housing 122 below reduced opening 40. Within housing 122 are located a power means (usually a battery), a motor, and a control means (the power means, motor, and control means are not shown but are well known in the art). A shaft extends from the motor through housing 122 where it is connected to paddle means 126. Paddle means 126 is a disc having ribs extending radially and vertically on the upper surface of the disc. Paddle means 126 is usually located directly below and between 0.25 and 1 inches away from reduced opening 40. The feed located within feed enclosure 32 has a tendency, due to the force of gravity, to fall through reduced opening 40. However, paddle means 126 stops the feed and prevents additional feed from flowing through reduced opening 40 until the paddle means is activated.

The control means, at pre-selected times and for pre-selected periods, activates the motor which in turn causes paddle means 126 to rotate. This rotation causes the feed in contact with paddle means 126 to be flung away from paddle means 126. As feed is flung away from paddle means 126, additional corn falls through reduced opening 40 and onto paddle means 126.

Referring now primarily to FIGS. 6 and 7, filling mechanism 130 is shown. The bucket-like filling container 132 has a bottom 134 and a sidewall 136. The top rim of the sidewall 136 defines an opening 138. At opposing points along the rim of filling container 132 are two loops 150 connected to filling container 132. The filling container 132 is capable of holding a predetermined amount of feed.

Filling mechanism 130 also has a bracket 140. Bracket 140 has a tubular frame comprising bottom portion 142, right and left vertical portions 144a, 144b, and right and left horizontal top portions 146a, 146b. A retaining pin 148 extends through the right top portion 146a of the bracket 140, through the loops 150 of the filling container 132, and through the left top portion 146b of the bracket 140. Thus, the filling container 132 can swing freely about a horizontal axis located above the filling container. A collar 152 is connected to the bottom side of bottom portion 142 of bracket 140. A slot 154 is located in the lower portion of the wall of collar 152. Collar 152 is adapted to receive the top portion of pole 156.

Pole 156 has a tab 158 toward the top portion thereof. The tab 158 is adapted to engage slot 154 of collar 152. The engagement of tab 158 with slot 154 prevents rotation between the bracket 140 and the pole 156, thereby facilitating the filling operation, as further described below. At the bottom portion of pole 156 is a handle 160 to facilitate the gripping of pole 156. Pole 156 is sufficiently long so that the user, standing on the ground can comfortably lift the filling container 132 to the height of the top of feed enclosure 32 and operate the filling mechanism 130 as described in more detail below.

Figure 9:
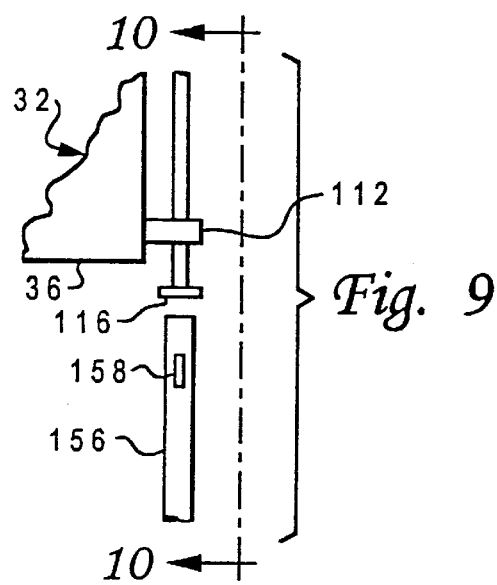
FIG. 9 is a detailed partial view showing the lower portion of the lid control bar and a pole for operating the lid control bar.
Figure 10:
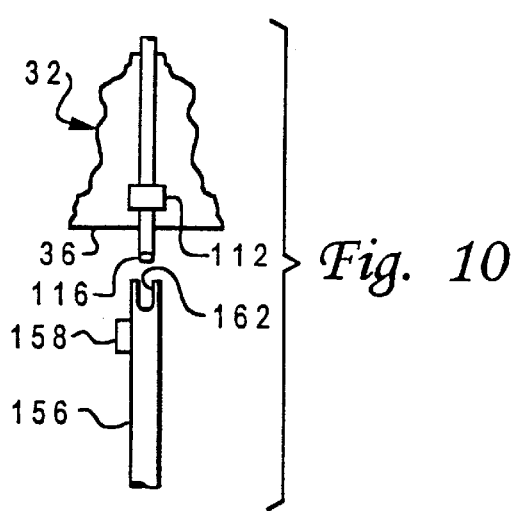
FIG. 10 is a view of the apparatus of FIG. 9 taken along line 10—10.

Pole 156 also has two slots 162 cut at the end thereof as shown in FIG. 7. Slots 162 are diametrically opposed along the wall of pole 156. The purpose of slots 162 is to allow the pole 156 to be used to operate lid control bar 110 from the ground. As shown in FIGS. 9 and 10, slots 162 are designed to mate with the small bar 116 connected to the bottom of lid control bar 110. By engaging slots 162 with small bar 116, the lid control bar 110, and thus lid 100, can be operated with the user standing on the ground.

The installation, operation, and removal of feeder 30 is described next. Once a desirable location for feeder 30 is located, pole 80 is anchored to ground 90 as explained in more detail above. The feed enclosure 32 (which is already connected to U-shaped bracket 50, feed-dispensing mechanism 122, and collar 60) is lifted using handles 42, is raised above the top of post 80, and is lowered over post 80 so that collar 60 engages post 80 as described in more detail above. Pin 66 is then inserted through holes 64 and 84 and, if desired, locked, as also described in more detail above. The control means of the feed-dispensing apparatus 122 can be programmed so that feed is dispensed at the desired intervals and desired quantities.

Figure 8:
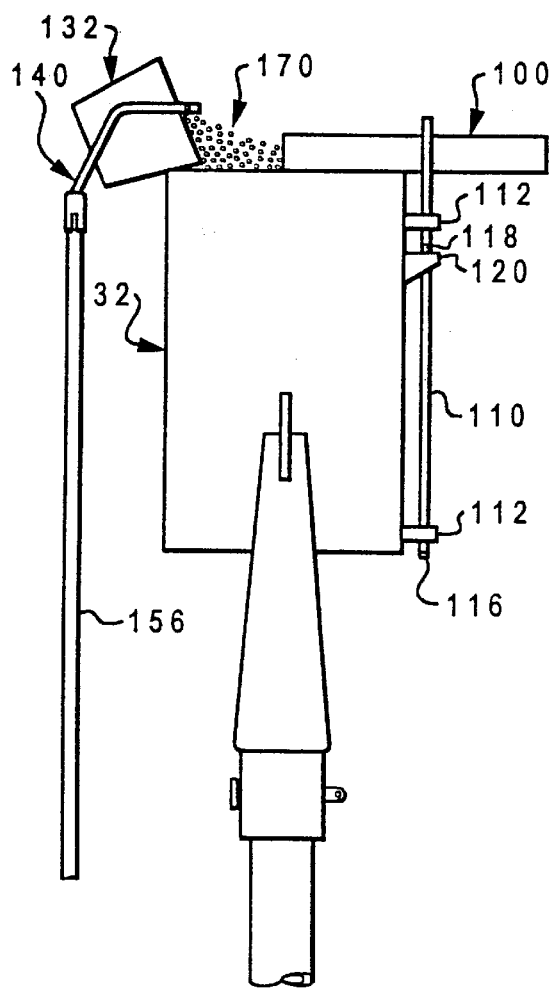
FIG. 8 is a partial view showing the filling mechanism of FIG. 6 in operation with the feeder of FIG. 1.

Assuming that the lid is initially in the closed position as shown in FIG. 4, pole 156 is used, as explained in more detail above, to operate the lid control bar 110 from the ground. As lid control bar 110 is raised, lid 100 is also raised. Bar 110 is raised enough to raise lip 104 of lid 100 completely above the top of feed enclosure 32, and for stop means 118 to be above stop means 120. Lid control bar 110 is then rotated so that stop means 118 comes to rest on stop means 120, as shown in FIG. 8. When lid control bar 110 is thus rotated, lid 100 is moved away from its closed position directly above fill opening 37 and is moved to the open position where fill opening 37 is exposed, as shown in FIG. 8.

Pole 156 is then inserted into collar 152 of bracket 140 of filling mechanism 130. Filling container 132 is then filled with feed. Pole 156 is then used to lift filling container 132 to the height of the top of feed enclosure 32. Pole 156 is moved towards feed enclosure 32 so as to cause filling container 132 to come into contact with the top of feed enclosure 32. Pole 156 is then forced further toward feed enclosure 32 so as to force the opening 138 of filling container 132 over the fill opening 37 of feed enclosure 32. This causes filling container 132 to pivot about retaining pin 148 and the feed 170 located in filling container 132 to fall through the fill opening 37 and into the feed enclosure 32. This is shown in FIG. 8.

The filling procedure can be repeated as many time as necessary to fill feed enclosure 32 to the desired level. Once this has been done. Pole 156 can again be used to operate lid control bar 110. Lid control bar 110 is rotated and then lowered so as to bring lid 100 back to the closed position.

If at some point in the future the user wishes to remove feeder 30, pin 66 can be removed, the feed enclosure (together with U-shaped bracket 50 and feed-dispensing mechanism 122) can be lifted using handles 42 and removed from atop post 80. A chain can be placed around post 80 and below removal tab 86 and pulled using a tractor, truck, or other pulling means, thereby removing the post 80 from ground 90.

Figure 11:
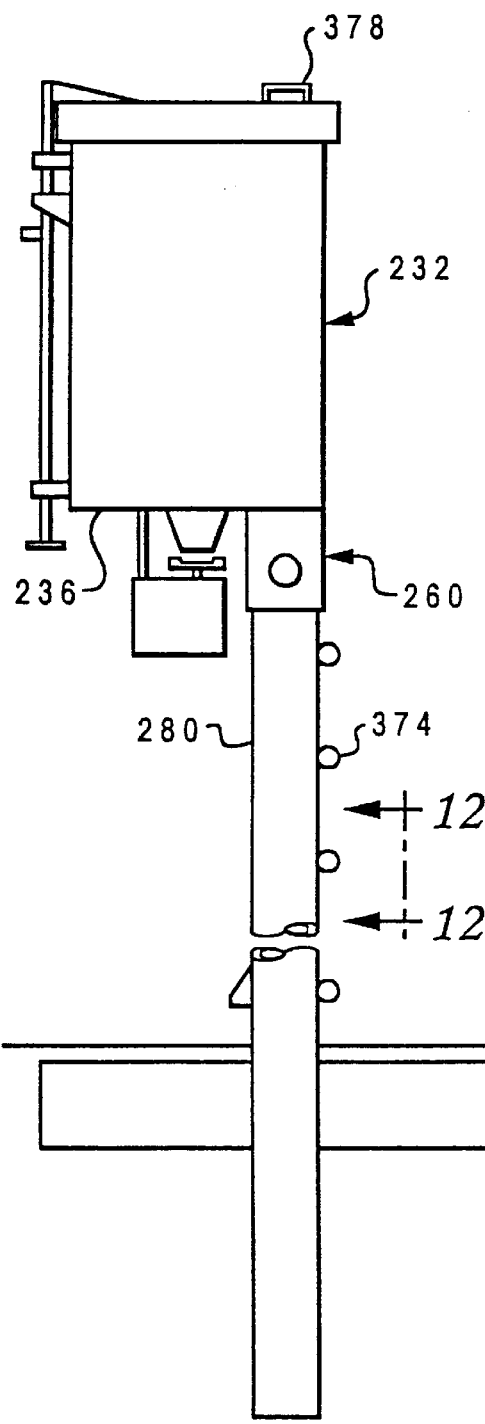
FIG. 11 is a front view of a second embodiment of a feeder made according to this invention.
Figure 12:
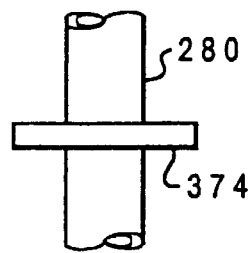
FIG. 12 is a view of the feeder of FIG. 11 taken along line 12—12.

A second embodiment of the present invention is shown in FIGS. 11 and 12. Referring now to those figures, a feed enclosure 232, similar to feed enclosure 32, is shown. Instead of using a bracket 50 as in the embodiment of FIGS. 3 and 4, the collar 260 is connected directly to a periphery of bottom 236 of feed enclosure 232. Post 280 is similar to post 80 except for foot pegs 374. Foot-pegs 374 are horizontal bars located every one to two feet along the height of post 280 to allow the user to climb up post 80 to fill feed enclosure 232. A handle 378 can be added to the lid to facilitate opening the lid if the user wishes to open the lid after climbing up foot-pegs 374 instead of opening the lid from the ground using the lid control bar. If desired, filling mechanism 130 can still be used with this embodiment in a fashion similar to that shown in FIG. 8. Also, if desired, foot-pegs 374 can be omitted. The remainder of the apparatus used in the embodiment of FIGS. 3 and 4 can also be used with this embodiment, as shown in FIG. 11.

Figure 13:
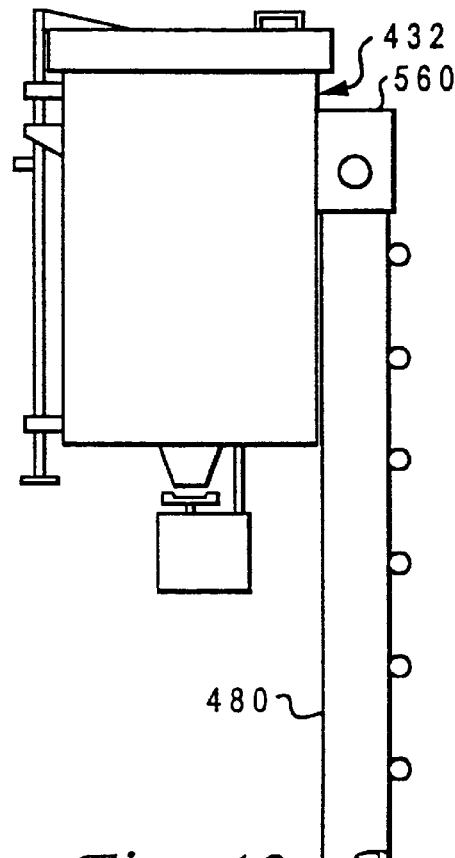
FIG. 13 is a front view of a third embodiment of a feeder made according to this invention.

A third embodiment is shown in FIG. 13. Referring now to that figure, this third embodiment is a variation of the second embodiment. Like the second embodiment, this third embodiment does not use the U-shaped bracket 50 of FIGS. 3 and 4. However, unlike the second embodiment, instead of connecting the collar to the bottom of the feed enclosure, collar 560 is connected to the outside of the sidewall of feed enclosure 432. The remainder of the apparatus for this third embodiment is the same as for the first and second embodiments, as shown in FIG. 13.

While the invention has been particularly shown and described with reference to a preferred embodiment and two other embodiments, it will be understood by those skilled in the art that various changes in form and detail may be made therein without departing from the spirit and scope of the invention.

What is claimed is:

1. An improved feeder for feeding large wild animals, the improved feeder comprising:
    a feed enclosure for holding feed, the feed enclosure having a bottom, sidewalls, and an open top defining a fill opening for filling the feed enclosure with feed;
    a reduced opening in the bottom of the feed enclosure for allowing the feed to pass therethrough:
    a single post supporting the feed enclosure above the ground and out of reach from the animals being fed;
    the feed enclosure being adapted to cooperate with a feed-dispensing apparatus that controls the flow of feed from the reduced opening and is capable of intermittently and selectively dispensing feed by propelling the feed from the reduced opening away from the feeder and within the reach of the animals, thus providing feed to the animals;
    a generally U-shaped bracket connected to the feed enclosure and extending below it; and
    a cylindrical collar connected to a lower portion of the U-shaped bracket, the cylindrical collar being adapted to fit over an upper end of the post, the upper end of the post being inserted in the collar.

2. The improved feeder according to claim 1 further comprising:
    a filling container capable of holding feed, the feed container having an opening at a top thereof;
    a bracket means for supporting the filling container and allowing the filling container to pivot about a substantially horizontal axis located toward the top of the filling container; and
    the bracket means being connectable to a pole, the pole being of sufficient length to allow a person standing on the ground to raise the filling container to the height of the top of the feed enclosure and to empty the contents of the filling container into the feed enclosure by causing the filling container to pivot about the horizontal axis thus causing the feed located in the filling container to fall into the feed enclosure of the feeder.

3. The improved feeder according to claim 1 further comprising:
    a lid positionable between a closed position in which the lid covers the fill opening and an open position in which the fill opening is exposed, the lid having a lip located around the circumference of a body of the lid and extending downwardly from the body so that when the lid is in the closed position the lip extends below the fill opening;
    a substantially vertical lid control bar extending along a sidewall of the feed enclosure and pivotally and slidably connected thereto so as to allow the lid control bar to slide vertically with respect to the feed enclosure and to pivot about its longitudinal axis; and
    the lid being connected to the lid control bar at a periphery of the lid, wherein the lid control bar can be raised and rotated to move the lid from the closed position to the open position and can be rotated and lowered to move the lid from the open position to the closed position.

4. The improved feeder according to claim 3 further comprising cooperating support means for supporting the lid in the open position.

5. The improved feeder according to claim 3 further comprising an engagement means connected to the lid control bar for engaging a lid control bar operating tool so as to allow operation of the lid control bar from the ground.

6. The improved feeder according to claim 1 wherein the post is secured to the ground using concrete.

7. An improved feeder for feeding large wild animals, the improved feeder comprising:
    a feed enclosure for holding feed, the feed enclosure having a bottom, sidewalls, and an open top defining a fill opening for filling the feed enclosure with feed;
    a reduced opening in the bottom of the feed enclosure for allowing the feed to pass therethrough;
    a single post supporting the feed enclosure above the ground and out of reach from the animals being fed;
    the feed enclosure being adapted to cooperate with a feed-dispensing apparatus that controls the flow of feed from the reduced opening and is capable of intermittently and selectively dispensing feed by propelling the feed from the reduced opening away from the feeder and within the reach of the animals, thus providing feed to the animals;
    a generally U-shaped bracket connected to the feed enclosure and extending below it; and
    a collar connected to a lower portion of the U-shaped bracket, the collar being adapted to engage an upper end of the post, the upper end of the post being engaged with the collar.

8. The improved feeder according to claim 7 further comprising:
    a filling container capable of holding feed, the feed container having an opening at a top thereof;
    a bracket means for supporting the filling container and allowing the filling container to pivot about a substantially horizontal axis located toward the top of the filling container; and
    the bracket means being connectable to a pole, the pole being of sufficient length to allow a person standing on the ground to raise the filling container to the height of the top of the feed enclosure and to empty the contents of the filling container into the feed enclosure by causing the filling container to pivot about the horizontal axis thus causing the feed located in the filling container to fall into the feed enclosure of the feeder.

9. The improved feeder according to claim 7 further comprising:

a lid positionable between a closed position in which the lid covers the fill opening and an open position in which the fill opening is exposed, the lid having a lip located around the circumference of a body of the lid and extending downwardly from the body so that when the lid is in the closed position the lip extends below the fill opening;

a substantially vertical lid control bar extending along a sidewall of the feed enclosure and pivotally and slidably connected thereto so as to allow the lid control bar to slide vertically with respect to the feed enclosure and to pivot about its longitudinal axis; and the lid being connected to the lid control bar at a periphery of the lid, wherein the lid control bar can be raised and rotated to move the lid from the closed position to the open position and can be rotated and lowered to move the lid from the open position to the closed position.

10. The improved feeder according to claim 9 further comprising cooperating support means for supporting the lid in the open position.

11. The improved feeder according to claim 9 further comprising an engagement means connected to the lid control bar for engaging a lid control bar operating tool so as to allow operation of the lid control bar from the ground.

12. The improved feeder according to claim 7 wherein the post is secured to the ground using concrete.

13. An improved feeder for feeding large wild animals, the improved feeder comprising:

a feed enclosure for holding feed, the feed enclosure having a bottom, sidewalls, and an open top defining a fill opening for filling the feed enclosure with feed;

a reduced opening in the bottom of the feed enclosure for allowing the feed to pass therethrough;

a feed-dispensing apparatus connected to the feed enclosure and controlling the flow of feed from the reduced opening and capable of intermittently and selectively dispensing feed by propelling the feed from the reduced opening away from the feeder and within the reach of the animals, thus providing feed to the animals;

a generally U-shaped bracket connected to the feed enclosure and extending below it;

a cylindrical collar connected to a lower portion of the U-shaped bracket;

a single post inserted in the collar and supporting the feed enclosure above the ground and out of reach from the animals being fed.

14. The improved feeder according to claim 13 further comprising:

a lid positionable between a closed position in which the lid covers the fill opening and an open position in which the fill opening is exposed, the lid having a lip located around the circumference of a body of the lid and extending downwardly from the body so that when the lid is in the closed position the lip extends below the fill opening;

a substantially vertical lid control bar extending along a sidewall of the feed enclosure and pivotally and slidably connected thereto so as to allow the lid control bar to slide vertically with respect to the feed enclosure and to pivot about its longitudinal axis; and the lid being connected to the lid control bar at a periphery of the lid, wherein the lid control bar can be raised and rotated to move the lid from the closed position to the open position and can be rotated and lowered to move the lid from the open position to the closed position.

* * * * *